(12) United States Patent
Rhee et al.

(10) Patent No.: US 8,793,625 B2
(45) Date of Patent: Jul. 29, 2014

(54) APPARATUS FOR AND METHOD OF DISPLAYING COMMUNICATION LOG USING GUI IMAGE

(75) Inventors: Young-ho Rhee, Gangnam-gu (KR); Young-kyu Jin, Gangnam-gu (KR); Joo-kyung Woo, Gangseo-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1173 days.

(21) Appl. No.: 11/650,938

(22) Filed: Jan. 9, 2007

(65) Prior Publication Data
US 2007/0174432 A1 Jul. 26, 2007

(30) Foreign Application Priority Data

Jan. 20, 2006 (KR) .................. 10-2006-0006465

(51) Int. Cl.
G06F 3/048 (2013.01)

(52) U.S. Cl.
USPC ........................................ 715/864; 715/783

(58) Field of Classification Search
CPC ...................................... G06F 3/048
USPC ................................ 715/864, 783
See application file for complete search history.

(56) References Cited

U.S. PATENT DOCUMENTS

| | | | |
|---|---|---|---|
| 5,537,618 A * | 7/1996 | Boulton et al. | 715/745 |
| 6,522,347 B1 * | 2/2003 | Tsuji et al. | 715/848 |
| 6,738,809 B1 * | 5/2004 | Brisebois et al. | 709/224 |
| 7,454,466 B2 * | 11/2008 | Bellotti et al. | 709/206 |
| 2002/0031210 A1 * | 3/2002 | Mohn et al. | 379/114.01 |
| 2002/0059418 A1 * | 5/2002 | Bird et al. | 709/224 |
| 2002/0147777 A1 * | 10/2002 | Hackbarth et al. | 709/205 |
| 2003/0186688 A1 * | 10/2003 | Mizuno | 455/415 |
| 2004/0148351 A1 * | 7/2004 | Cotte | 709/205 |
| 2004/0153456 A1 * | 8/2004 | Charnock et al. | 707/10 |
| 2004/0221309 A1 * | 11/2004 | Zaner et al. | 725/46 |
| 2005/0020247 A1 * | 1/2005 | Lakkala | 455/412.2 |
| 2005/0043987 A1 * | 2/2005 | Kumar et al. | 705/11 |
| 2005/0163304 A1 * | 7/2005 | Judkins et al. | 379/265.02 |
| 2005/0240661 A1 * | 10/2005 | Heller et al. | 709/219 |
| 2006/0010206 A1 * | 1/2006 | Apacible et al. | 709/205 |
| 2006/0085515 A1 * | 4/2006 | Kurtz et al. | 709/207 |
| 2006/0094404 A1 * | 5/2006 | Burgess | 455/412.1 |
| 2007/0067159 A1 * | 3/2007 | Basu et al. | 704/200 |

FOREIGN PATENT DOCUMENTS

| | | |
|---|---|---|
| CN | 1246016 A | 3/2000 |
| KR | 10-2001-0060864 A | 7/2001 |
| KR | 10-2004-0067673 A | 7/2004 |
| KR | 10-2004-0079159 A | 9/2004 |
| KR | 10-2004-0090594 A | 10/2004 |
| KR | 1020040105478 | 12/2004 |
| KR | 1020050117600 | 12/2005 |

* cited by examiner

*Primary Examiner* — Doon Chow
*Assistant Examiner* — Le Nguyen
(74) *Attorney, Agent, or Firm* — Sughrue Mion, PLLC

(57) ABSTRACT

An apparatus and method for displaying a communication log using a graphical user interface (GUI) image are provided. The apparatus for displaying a communication log using a GUI image includes a storage unit that stores information relating to events which have been generated through a mobile terminal as data, a statistical analysis unit that uses a statistical analysis application to analyze the data so as to obtain statistical data, and an output unit that outputs a GUI image in which a ranking of communication amounts of the mobile terminal is displayed using the statistical data.

19 Claims, 6 Drawing Sheets

APPARATUS FOR AND METHOD OF DISPLAYING COMMUNICATION LOG USING GUI IMAGE

CROSS REFERENCE TO RELATED APPLICATION

This application claims priority from Korean Patent Application No. 10-2006-0006465 filed on Jan. 20, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to displaying a communication log using a graphical user interface (hereinafter, simply referred to as a "GUI") image. More particularly, the present invention relates to an apparatus for and method of to displaying a communication log using a GUI image that provides communication ranking information for each of a plurality of users by using statistical data on communication logs accumulated in a personal mobile terminal, and visually displays an amount of communication according to each of the plurality of users by using the GUI image.

2. Description of the Related Art

Recently, due to the widespread use of mobile terminals having high capacity memories, users of the mobile terminals spend time and effort to manage personal networks which include people around the users by classifying and recording addresses, which are recorded in the users' own terminals, into respective groups, such as, friends, co-workers, families, and the like, or updating contents that are newly added or changed.

In light of the above, techniques that allow the user to easily see a communication log, using data such as the number of calls to specific telephone numbers, the total conversation time, the number of SMS messages transmitted, and so on, have been proposed.

Korean Laid-Open Publication No. 2004-0079159 discloses a method of editing call lists that accumulates the number of calls made to multiple contacts, and lists the contacts' phone numbers in order based on the number of calls that have been made in a specified period of time, when a user searches for a telephone number. Further, Korean Laid-Open Publication No. 2004-0090594 discloses a method of displaying communication time that displays communication time information in a graphic bar by collecting statistics regarding communication time according to date and time of the communication.

However, the related art merely compare records, such as communication time. Accordingly, it is not possible to display comparative rankings in a visual way, such as a GUI, using statistics on various communication logs, such as telephone traffic and the number of SMS/MMS messages transmitted.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus for and method of displaying a communication log using a GUI image, in which efficient communication and human relationship management occur by using statistical data on communication that has been performed with others through a personal mobile terminal.

According to an aspect of the present invention, an apparatus for displaying a communication log using a GUI image includes a storage unit which stores information relating to events generated through a mobile terminal as data, a statistical analysis unit which uses a statistical analysis application to analyze the data as statistical data, and an output unit which outputs a GUI image in which a ranking of communication amounts of the mobile terminal is displayed using the statistical data.

According to another aspect of the present invention, a method of displaying a communication log using a GUI image includes storing events generated through a mobile terminal as data, using a statistical analysis application to analyze the data as statistical data, and outputting a GUI image in which a ranking of communication amounts of the mobile terminal is displayed using the statistical data.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be exemplarily embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The exemplary embodiments of the present invention will now be described more fully with reference to block diagrams or flow charts, in which an apparatus for and a method of displaying a communication log using a GUI image that are previously defined by exemplary embodiments of the invention are shown.

Figure 1:
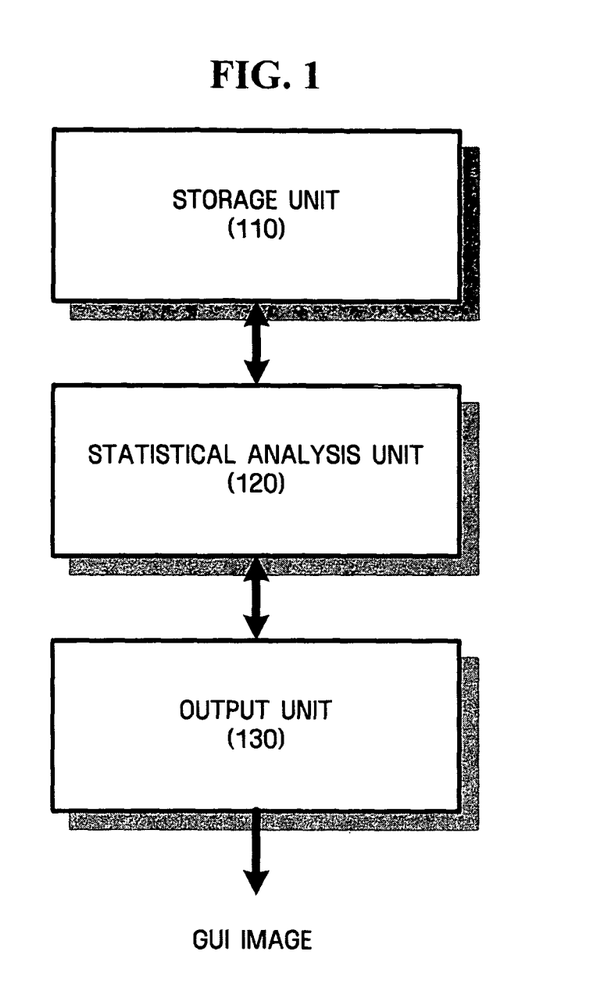
FIG. 1 is a view showing the entire construction of an apparatus for displaying a communication log using a GUI image according to an exemplary embodiment of the present invention.

FIG. 1 is a view showing the entire construction of an apparatus for displaying a communication log using a GUI image according to an exemplary embodiment of the present invention: Referring to FIG. 1, the apparatus according to the exemplary embodiment of the present invention includes a storage unit 110, a statistical analysis unit 120, and an output unit 130.

When a user generates events by using the personal mobile terminal, the storage unit 110 stores information regarding the generated events as data information. Here, the events refer to transmission and reception of short message service (SMS) messages, phone calls, phone billing, the use of the mobile terminal as a traffic card, use of the mobile terminal as an alarm, photographing, and accesses to mobile blogs, which are generated by the user through the mobile terminal. Further, the data information on the events can be stored in a storage unit, such as, an external or internal memory of the mobile terminal.

When the storage unit 110 stores the information regarding the events as the data information, the statistical analysis unit 120 uses an application to analyze the data information as statistical data. Here, the statistical data may be obtained by analyzing a total amount of communication using a statistical analysis application. At this time, the total amount of communication includes the number of transmitted SMS messages, the number of transmitted MMS messages, conversation time, the number of files transmitted, such as image files or music files, the number of calls while a user is absent, and the number of times mobile blogs are accessed.

In addition, the analyzed statistical data may be obtained by analyzing the total amount of communication with different priorities respectively given to items constituting the entire transmission amount. That is, generally, when a frequent contact is established between the user and a plurality of contacts, the user tends to frequently make calls and send short messages to the contacts. Therefore, the number of SMS messages transmitted and the conversation time are applied with high priority and the number of calls during the user's absence or the number of files transmitted is applied with low priority, and thus relationship with communication counterparts can be analyzed by the statistical data.

The output unit 130 outputs a ranking of the communication logs of the mobile terminal by a graphical user interface (GUI) image using the above-described statistical data. Detailed exemplary embodiments of GUI images that are output by the output unit 130 will be described with reference to FIGS. 2 to 4.

Figure 2:
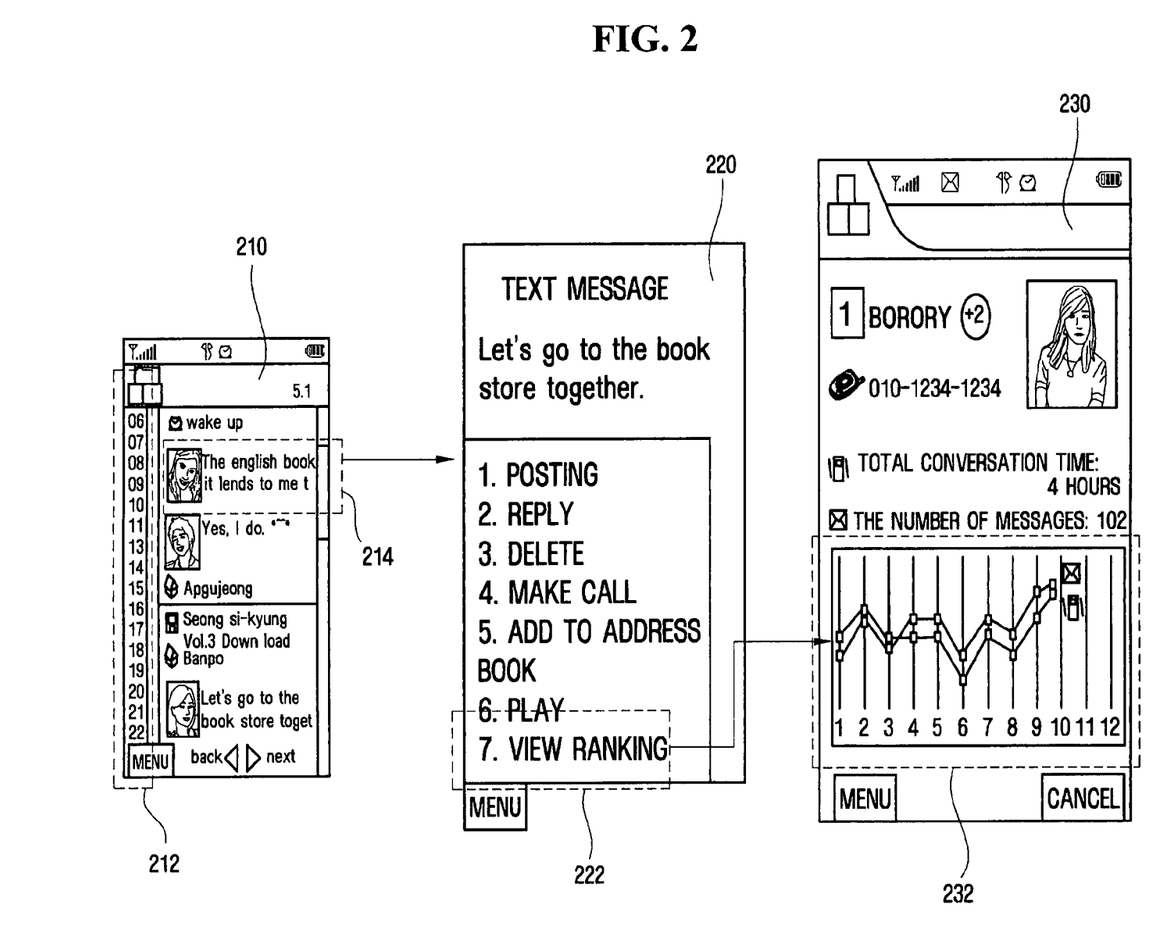
FIG. 2 is a view showing a GUI image in which a communication log for a specific phone number is displayed in a graph according to an exemplary embodiment of the present invention.

FIG. 2 is a view showing a GUI image in which a communication log for a specific phone number is displayed in a graph according to an exemplary embodiment of the present invention.

Referring to FIG. 2, a screen of a life diary application 210 is displayed. In the life diary application 210, event items 214 that have been generated through the mobile terminal are expressed by graphic information according to a time axis 212. The time axis 212, which vertically displays a day according to time slots, is shown on the left of the screen of the life diary application 210, and the event items according to the time slots are shown on the right thereof. For example, at 6 a.m., an alarm event has occurred, and at 8 a.m., a short message service (SMS) event and a traffic card usage event have occurred. In addition, an event of downloading a music file is displayed.

According to a first exemplary embodiment of the present invention, the user selects the event item 214 with respect to SMS reception having occurred at 8 a.m. on the screen of the life diary application 210. As a result of the selection, a text message screen 220 is displayed. When a menu item on a lower left end of the text message screen 220 is selected, the output unit 130 displays various exemplary menu items. When the user selects a "7. View Ranking" item 222, the output unit 130 displays a GUI image 230 in which a communication log for a specific telephone number communicating with the mobile terminal is displayed in a graph 232. At this time, in the graph 232 of FIG. 2, it is possible to easily know fluctuation of conversation time and the number of SMS messages received per month by giving high priority to the number of SMS messages received and the conversation time. For reference, it can be known that the total communication time is 4 hours and the number of SMS messages received is 102 in total.

Figure 3A:
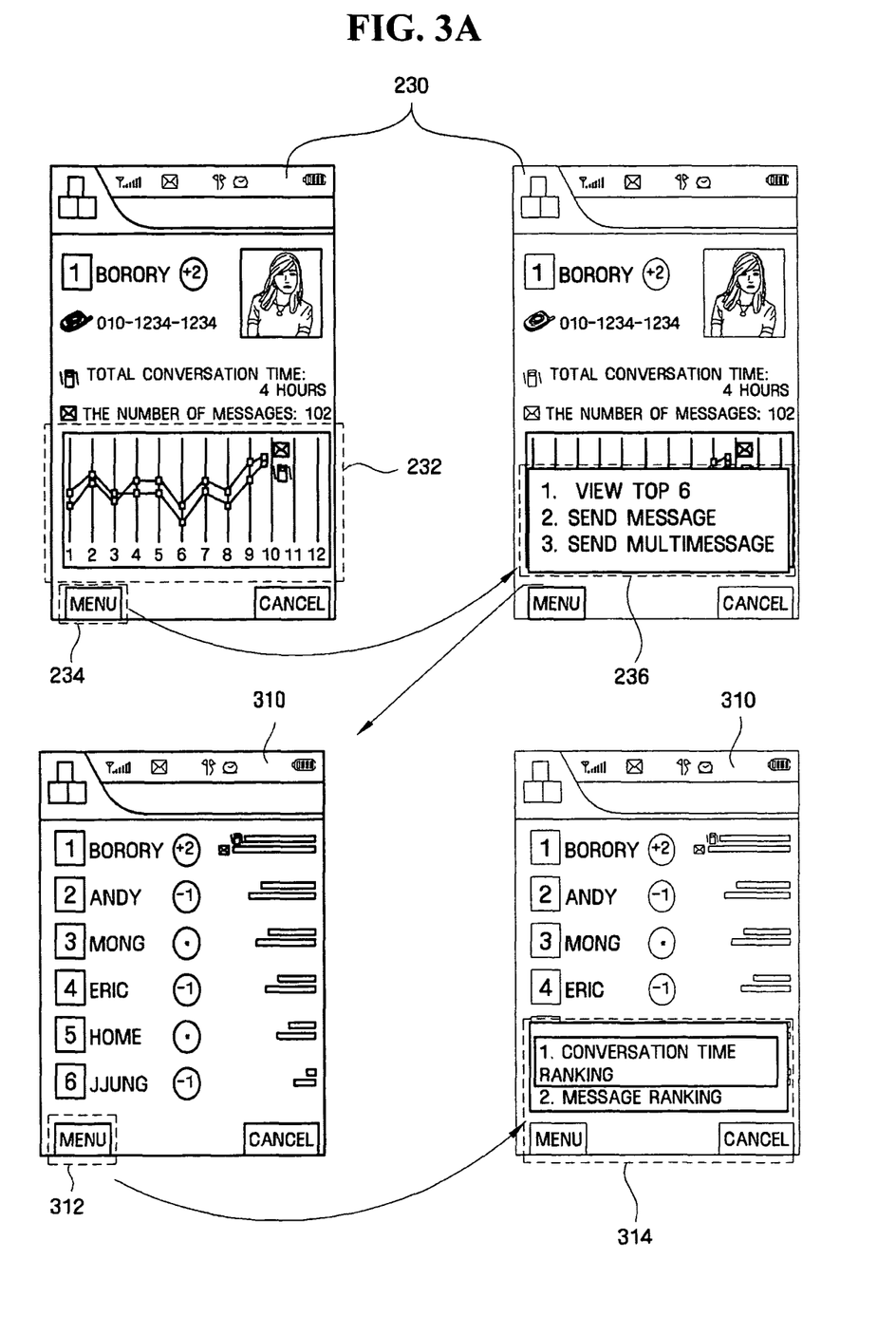
FIGS. 3A and 3B are views showing GUI images in which communication logs for all the telephone numbers are classified according to ranks according to an exemplary embodiment of the present invention.
Figure 3B:
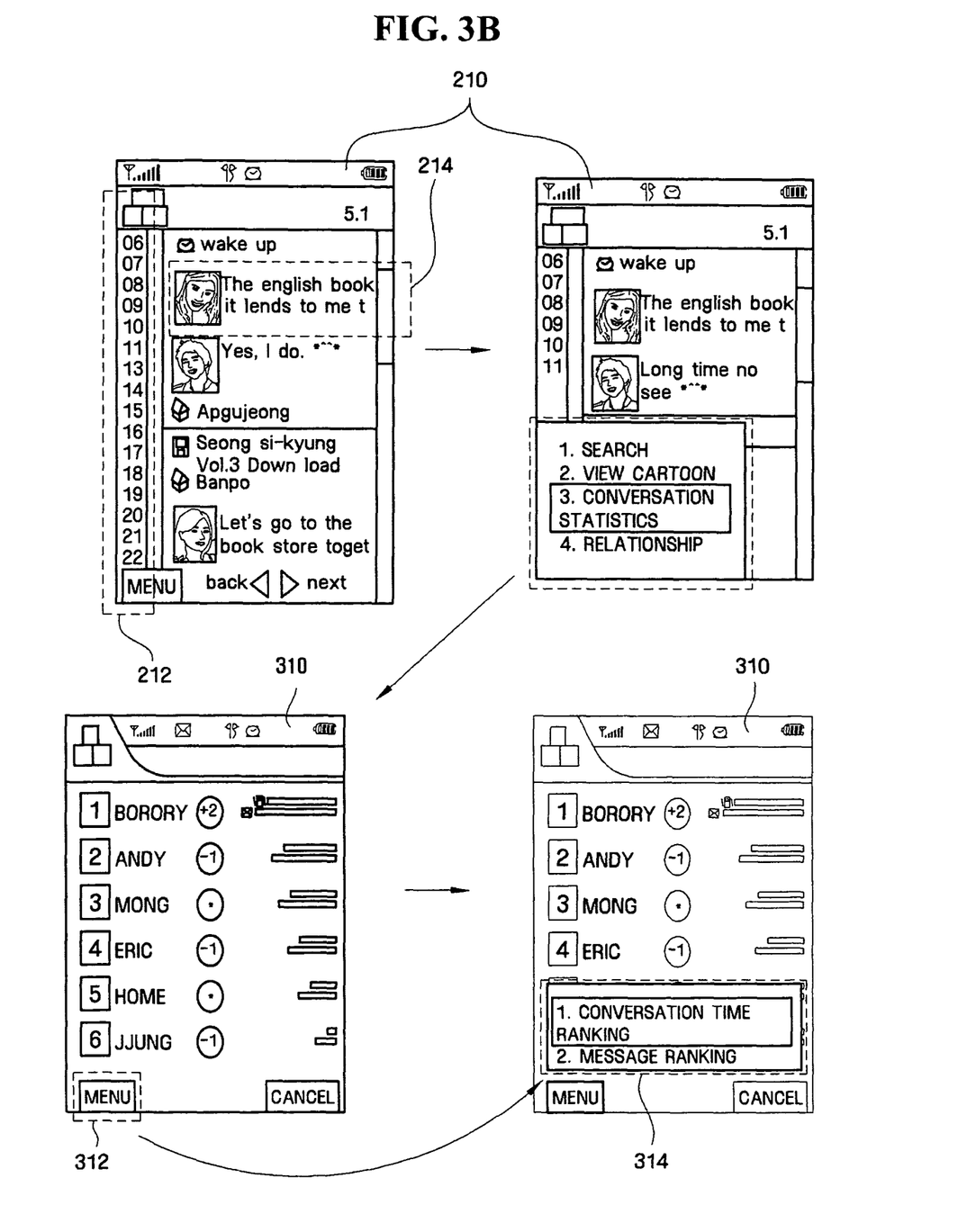

FIG. 3A and FIG. 3B are views showing GUI images in which communication logs for all the telephone numbers are classified according to ranks according to a second embodiment of the present invention.

The output screen in FIG. 2 is the GUI image 230 that displays the communication log for the specific telephone number in the graph 232, while in FIGS. 3A and 3B, the output unit 130 outputs a GUI image 310 in which the communication logs for all the telephone numbers having communicated with the mobile terminal are ranked first to n-th, which is set by the user.

First, referring to FIG. 3A, when a menu item 234 of the GUI image 230 that displays the communication log for the specific telephone number shown in FIG. 2 in the graph is selected, sub-menu items 236 are displayed. On the assumption that communication logs are set by a user to be ranked first to sixth in the second exemplary embodiment of the present invention, when the user selects a "1. View Top 6" item from the sub-menu items 236, the output unit 130 displays the GUI image 310 in which the communication logs for all the telephone numbers are ranked first to sixth. In the GUI image 310, a top 6 communication log ranking is displayed, and the communication time with each contact and the number of SMS messages received from each contact are shown in a bar graph. When the menu item 312 is selected in the GUI image 310, the sub-menu items 314 are displayed. Then, when a "1. Conversation Time Ranking" item is selected from the sub-menu items 314, the output unit 130 outputs a screen of the GUI image 230 again in which the communication log for the specific telephone number is shown in the graph.

Meanwhile, the screen of the GUI image 310, in which the communication logs for all the telephone numbers are classified according to the ranks, may be output from the screen of the GUI image 230 in which the communication log for the specific telephone number is displayed in the graph, as shown in FIG. 3A. Alternatively, it may directly output from the life diary application 210 screen, which is shown in FIG. 3B.

Referring to FIG. 3B, when the menu item on the left lower end of the screen of the life diary application 210 is selected, various sub-menu items are displayed. In the second exemplary embodiment of the present invention, there are four sub-menu items, that is, "1. Search", "2. View Cartoon", "3. Conversation Statistics", and "4. Friendship" items. When the "3. Conversation Statistics" item is selected among the four sub-menu items, the output unit 130 directly displays the GUI image 320 in which the communication logs for all the telephone numbers are classified according to the ranking.

Meanwhile, the GUI images 230 and 310 can be displayed on the basis of a day, a week, a month, or a specific period that is set by the user. In the embodiments, the GUI images are displayed on the basis of the conversation time and the number of SMS messages received from January to October.

Figure 4:
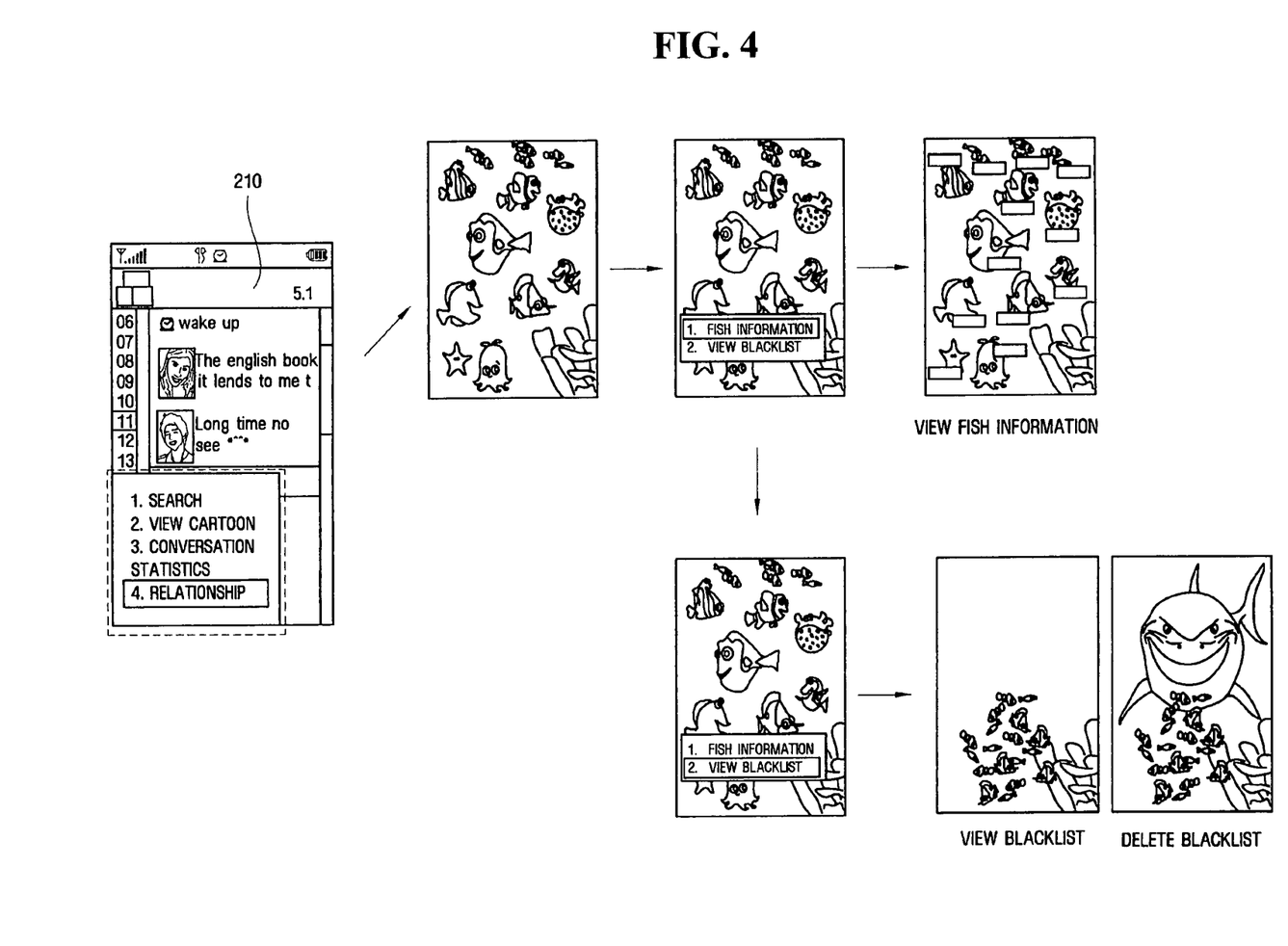
FIG. 4 is a view showing a GUI image expressed by graphic information using an animation effect according to an exemplary embodiment of the present invention.

FIG. 4 is a view showing a GUI image expressed by graphic information using an animation effect according to a third exemplary embodiment of the present invention. That is, the output unit 130 may express the communication logs for all the telephone numbers, which are classified according to the ranks in the GUI image 310, using an animation effect, such as a group of fishes under the sea. Referring to FIG. 4, when the "4. Relationship" item is selected from the sub-menu items of the life diary application 210, the communication counterparts, who are stored in an address book, are represented by fishes under the sea and move. That is, one fish itself shows information on communication between the user and one communication counterpart.

For example, when a menu item "1. Fish Information" is selected in the graphic information displayed as the group of fishes, names of the communication contacts, which are stored in the address book, are shown below the fishes, respectively. In addition, it is possible to differentiate and display the fishes by setting a color, a size, and an amount of movement of the fishes to be different from each other, on the basis of communication with the user. The more communication the contact has performed with the user, the larger the fish is or the faster the fish moves. In addition, by selecting different colors for the fishes, it is possible to display and differentiate the information. When a "2. View Black List" item is selected, the contacts who have little communication with the user can be deleted from the address book.

Meanwhile, the term "unit" used in the exemplary embodiments, that is, "module" or "table" means software, or a hardware component such as an FPGA (Field Programmable Gate Array) or an ASIC (Application Specific Integrated Circuit) and the modules each perform assigned functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and or modules may be separated into additional components and modules. In addition, the components and the modules may be configured to execute at least one CPU in a device.

Figure 5:
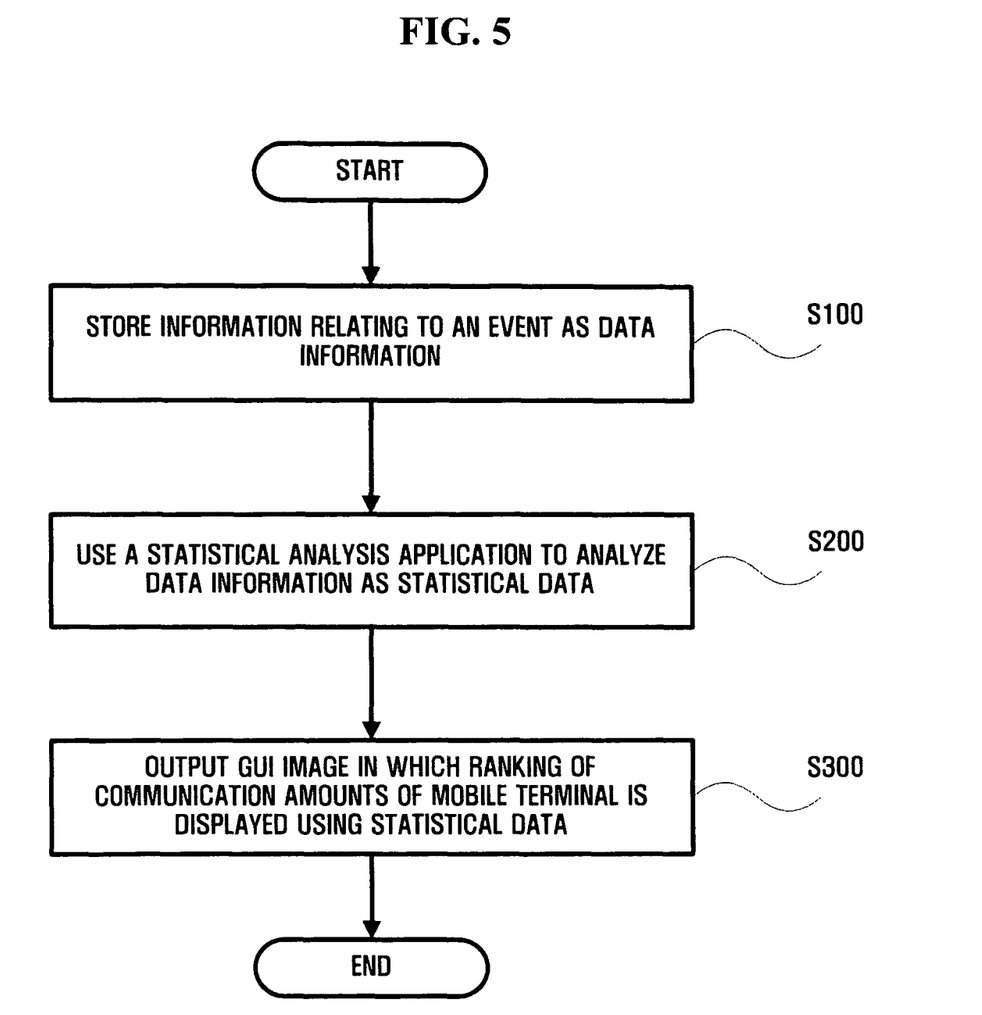
FIG. 5 is a flow chart showing a method of displaying a communication log using a GUI image according to an exemplary embodiment of the present invention.

An exemplary embodiment of the present invention will now be described according to the lapse of time with reference to FIG. 5. FIG. 5 is a flow chart showing a method of displaying a communication log using a GUI image according to an exemplary embodiment of the present invention.

First, the storage unit 110 stores information regarding events which have been generated through a mobile terminal as data information (S100).

Then, the statistical analysis unit 120 uses an application to analyze the data information as statistical data (S200). Here, the statistical data may be statistical data on a total amount of communication that includes the number of short message service (SMS) messages transmitted, the number of multimedia message service (MMS) messages transmitted, conversation time, the number of files transmitted, the number of calls while a user is absent, and the number of accesses to mobile blogs. The statistical data can be obtained by analyzing the total amount of communication with the different priorities respectively given to items that are included in the entire communication.

Finally, the output unit 130 outputs a GUI image in which a ranking of the communication logs of the mobile terminal is shown using the statistical data (S300).

In this case, the output unit 130 may output the GUI image 230 in which the items of the communication log for the specific telephone number having communicated with the mobile terminal are classified according to the different priorities and displayed in a graph.

In addition, the output unit 130 may output the GUI image 310 in which the communication logs for all the telephone numbers, which have communicated with the mobile terminal, are ranked first to n-th, which is set by the user. At this time, the GUI images 230 and 310 are output on the basis of a day, a week, a month, or a specific period that is set by the user. In addition, a GUI image, in which the communication logs are expressed by graphic information using an animation effect, may be output. In this case, colors, sizes, and amounts of movement of the animation characters are set to be different from each other on the basis of the amount of the communication logs, such that the communication amounts can be differentiated and displayed.

Meanwhile, it will be understood by those skilled in the art that a computer readable recording medium having a program code for allowing a computer to execute the methods according to the exemplary embodiments of the invention stored therein can be included in the scope of the invention.

While the invention has been described with reference to the accompanying drawings, it will be understood by those skilled in the art that various modifications, changes and substitutions of the invention can be made without departing from the spirit and scope of the invention as defined by the following claims. Therefore, it is to be understood that the above-described embodiments are just illustrative examples and the invention is not limited to the above-described exemplary embodiments. The present invention will be defined by the appended claims to be described below, rather than the disclosure. It should be understood that the present invention is intended to cover meanings of the scope of the claims and various modifications and changes deduced from the equal concept.

According to the exemplary embodiments of the present invention, efficient communication and human relationship management can be made by using statistical data on communication that has been performed with others through a personal mobile terminal.

Effects of the present invention are not limited to those mentioned above, and other effects of the present invention will be apparently understood by those skilled in the art through the appended claims.

What is claimed is:

1. An apparatus for displaying a communication log using a graphical user interface (GUI) image, the apparatus comprising:
   a storage unit which stores information related to events including different types of event items generated through a first mobile terminal as data;
   a statistical analysis unit which uses an application to analyze the data as statistical data, wherein the statistical data is obtained by analyzing an amount of communication of the events with different priorities respectively given to the different types of event items of the events; and an output unit which outputs a GUI image which displays a ranking of communication amounts of the first mobile terminal using the statistical data, wherein each of the priorities determines an amount of fluctuation of a corresponding one of the event items, wherein the GUI image displays user information of a plurality of mobile terminals that have communicated with the first mobile terminal in response to a user's selection of a view item displayed on the GUI image, wherein the user information of the plurality of mobile terminals is displayed in a ranking order along with all of communication amounts of the different types of event items for the plurality of mobile terminals, wherein the statistical data comprises at least one of a number of short message service (SMS) messages transmitted, a number of multimedia message service (MMS) messages transmitted, conversation time, a number of files transmitted, a number of calls received while a user is absent, and a number of times mobile blogs are accessed, wherein the statistical data is obtained by analyzing a total amount of communication of the events with the different priorities respectively given to the different types of event items included in the total amount of communication.

2. The apparatus of claim 1, wherein the output unit outputs a GUI image in which items of a communication log for a specific telephone number of a second mobile terminal of the plurality of mobile terminals that has communicated with the first mobile terminal are classified according to different priorities and displayed in a graph.

3. The apparatus of claim 2, wherein the GUI image is output on the basis of a time period set by a user.

4. The apparatus of claim 1, wherein the GUI image is output on the basis of a time period set by a user.

5. The apparatus of claim 1, wherein the GUI image shows the communication amounts, which are ranked first to n-th, expressed by graphic information using an animation effect.

6. The apparatus of claim 5, wherein the graphic information is set such that at least one of a color, a size and an amount of movement is different according to the respective communication amount.

7. The apparatus of claim 2, wherein the GUI image is output when a conversation statistics menu item is chosen from a plurality of menu items from a main screen of an application that displays events, which have been generated through the first mobile terminal, by graphic information according to time slots.

8. The apparatus of claim 1, wherein the GUI image is output when a conversation statistics menu item is chosen from a plurality of menu items from a main screen of an application that displays events, which have been generated through the first mobile terminal, by graphic information according to time slots.

9. The apparatus of claim 5, wherein the GUI image is output when a relationship menu item is chosen from a plurality of menu items from a main screen of a life diary application that displays events, which have been generated through the first mobile terminal, by the graphic information according to time slots.

10. A method of displaying a communication log using a graphical user interface (GUI) image, the method comprising:

storing information relating to events including different types of event items generated through a first mobile terminal as data;

using an application to analyze the data as statistical data, wherein the statistical data is obtained by analyzing an amount of communication of the events with different priorities respectively given to the different types of event items of the events; and outputting a GUI image in which a ranking of communication amounts of the first mobile terminal is displayed using the statistical data, wherein each of the priorities determines an amount of fluctuation of a corresponding one of the event items, wherein the GUI image displays user information of a plurality of mobile terminals that have communicated with the first mobile terminal in response to a user's selection of a view item displayed on the GUI image, wherein the user information of the plurality of mobile terminals is displayed in a ranking order along with all of communication amounts of the different types of event items for the plurality of mobile terminals, wherein the statistical data comprises at least one of a number of short message service (SMS) messages transmitted, a number of multimedia message service (MMS) messages transmitted, conversation time, a number of files transmitted, a number of calls received while a user is absent, and a number of times mobile blogs are accessed, wherein the statistical data is obtained by analyzing a total amount of communication of the events with the different priorities respectively given to the different types of event items included in the total amount of communication.

11. The method of claim 10, wherein the outputting comprises outputting a GUI image in which items of a communication log for the specific telephone number of the second mobile terminal that has communicated with the first mobile terminal are classified according to different priorities and displayed in a graph.

12. The method of claim 11, wherein the GUI image is output on the basis of a time period set by the user.

13. The method of claim 10, wherein the GUI image is output on the basis of a time period set by a user.

14. The method of claim 10, wherein the GUI image shows the communication logs, which are ranked first to n-th, expressed by graphic information using an animation effect.

15. The method of claim 14, wherein the graphic information is set such that at least one of a color, a size and an amount of movement is different on the basis of the communication amount.

16. The method of claim 11, wherein the GUI image is output when a conversation statistics menu item is chosen from a plurality of menu items from a main screen of an application that displays events, which have been generated through the first mobile terminal, by graphic information according to time slots.

17. The method of claim 10, wherein the GUI image is output when a conversation statistics menu item is chosen from a plurality of menu items of a main screen of an application that displays events, which have been generated through the first mobile terminal, by graphic information according to time slots.

18. The method of claim 14 wherein the GUI image is output when a relationship menu item is chosen from the menu items of the main screen of a life diary application that displays events, which have been generated through the first mobile terminal, by the graphic information according to time slots.

19. A computer readable recording medium having a program code for allowing a computer to execute the method of claim 10.

* * * * *